United States Patent
Aslan et al.

(10) Patent No.: US 6,187,256 B1
(45) Date of Patent: Feb. 13, 2001

(54) METHOD OF PRODUCING A CONDUCTIVE SILICON CARBIDE-BASED SINTERED COMPACT

(75) Inventors: Mesut Aslan, Pirmasens; Rüdiger Nass, Riegelsberg; Helmut Schmidt, Saarbrücken-Güdingen, all of (DE)

(73) Assignee: Institut für Neue Materialen gemeinnützige GmbH, Saarbrücken (DE)

( * ) Notice: Under 35 U.S.C. 154(b), the term of this patent shall be extended for 0 days.

(21) Appl. No.: 09/051,375

(22) PCT Filed: Oct. 9, 1996

(86) PCT No.: PCT/EP96/04381

§ 371 Date: Apr. 8, 1998

§ 102(e) Date: Apr. 8, 1998

(87) PCT Pub. No.: WO97/13734

PCT Pub. Date: Apr. 17, 1997

(30) Foreign Application Priority Data

Oct. 10, 1995 (DE) ............................................. 195 37 714

(51) Int. Cl.[7] ...................... C04B 35/565; C04B 35/576
(52) U.S. Cl. ...................... 264/666; 264/674; 264/676; 264/682; 252/504; 501/90
(58) Field of Search .................................. 264/666, 674, 264/682, 676; 501/90; 252/504

(56) References Cited

U.S. PATENT DOCUMENTS

| | | | |
|---|---|---|---|
| 4,230,497 | * 10/1980 | Schwetz et al. | 264/674 |
| 4,753,903 | * 6/1988 | Saito | 501/88 |
| 4,853,299 | * 8/1989 | Mizutani | 428/698 |
| 5,322,824 | * 6/1994 | Chizu | 501/89 |

FOREIGN PATENT DOCUMENTS

3630369 * 3/1987 (DE) .
591698 * 4/1994 (EP) .

* cited by examiner

*Primary Examiner*—James Derrington
(74) *Attorney, Agent, or Firm*—Heller Ehrman White & McAuliffe LLP

(57) ABSTRACT

A process is described for producing a conductive sintered body based on silicon carbide, in which
  a) silicon carbide particles, optionally pretreated with a surface modifier, are dispersed in an aqueous and/or organic medium and positive or negative surface charges are generated on the silicon carbide particles by adjustment of the pH of the dispersion obtained;
  b) carbon black and boron carbide are mixed in as sintering aids, where at least the carbon black particles have a surface charge opposite to the surface charge of the silicon carbide particles and the boron carbide can also be added, completely or in part, at a later point in time (stage c'));
  c) the slip thus obtained is shaped directly to form a green body or
  c') a sinterable powder is isolated from the slip obtained and is shaped to form a green body, where the above boron carbide can also be added to this sinterable powder; and
  d) the green body obtained is subjected to pressureless sintering to form a sintered body in essentially three successive steps, namely (i) preheating to 1200–1900° C. in a nitrogen containing atmosphere (ii), sintering at 1900–2200° C. in a noble gas atmospher and (iii) post-heating at 2150–1850° C. and subsequent cooling to ambient temperature in an atomosphere containing nitrogen and/or carbon monoxide.

10 Claims, 1 Drawing Sheet

METHOD OF PRODUCING A CONDUCTIVE SILICON CARBIDE-BASED SINTERED COMPACT

Figure 1:
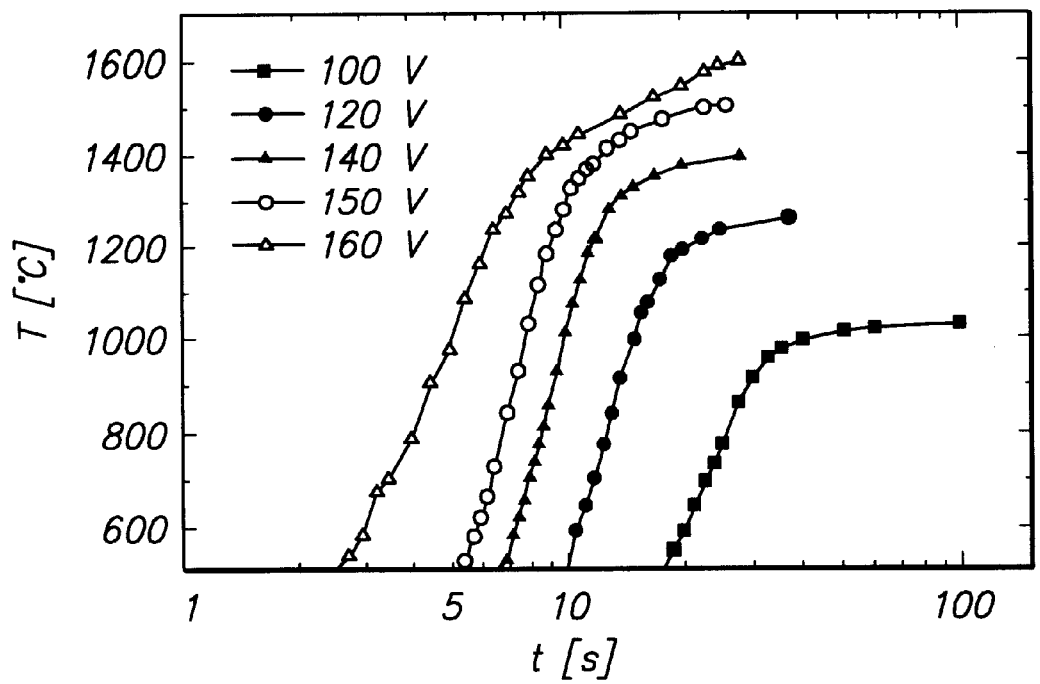

Materials based on silicon carbide have been known for some time and are utilized in a variety of ways for producing components. They have a series of interesting properties, including the low density, the high hardness, the low coefficient of thermal expansion, the good oxidation and corrosion resistance and also a favourable creep behaviour and high thermal conductivity.

Furthermore, pure SiC has semiconducting properties, with the corresponding electrical behaviour. Of particular interest here is pressureless sintered SiC, since it combines most of the abovementioned properties with a very good thermomechanical behaviour (high strength at high temperature).

It is known from the prior art that, only by using sintering aids, SiC can be subjected to pressureless sintering. Possible sintering aids which have been described are a great number of different compounds and material combinations, including, inter alia, metals such as aluminium, iron, lithium or magnesium and also metal oxides such as aluminium oxide, beryllium oxide and rare earth metal oxides. However, only combinations of carbon/boron, carbon/boron carbide and carbon/aluminium have become established as sintering aids in industrial use. It is worth noting that only small amounts of sintering aids are required to achieve virtually complete densification. The values published hitherto for carbon are between 1.5 and 2.6% by weight and for boron or boron carbide between 0.3 and 1% by weight, based on silicon carbide used. During sintering, the carbon acts as a reducing agent and cleans the grain surface of the SiC of $SiO_2$. Associated therewith is an increase in the surface energy of the powder and the grain boundary diffusion during sintering. In contrast, boron is incorporated at the grain boundaries and increases the volume diffusion during sintering. At the same time it acts against grain growth. To enable use to be made of these advantageous properties of the sintering aids, they have to be distributed homogeneously in the green ceramic. The necessary homogeneity can be achieved in various ways. Frequently, the powder mixture comprising SiC and sintering aids is subjected to intensive wet milling in the presence of surface-active substances. A particularly high homogeneity is achieved when the individual SiC particles are coated directly with nanosize sintering aids (e.g. nanosize carbon black), as is disclosed in DE-A-42 33 626.

In addition, it is known that production of SiC materials having a good electrical conductivity requires dopants. These dopants include, inter alia, aluminium nitride, molybdenum disilicide, phosphorus, arsenic and antimony. However, these additives have an unfavourable influence on the sintering behaviour of the ceramic, so that sufficient densification can only be achieved by pressure-supported sintering processes (hot pressing, hot isostatic pressing), but SiC ceramics produced by these methods still have a relatively high porosity and have only limited oxidation stability in air at high temperature.

Accordingly, it is an object of the present invention to produce SiC materials having good electrical properties, in particular good electrical conductivity, good oxidation resistance and high strength by pressureless sintering.

It has surprisingly been found that this object can be achieved by means of the system ($\alpha$-)SiC/$B_4$C/carbon if the green bodies are produced by the process described in DE-A-42 33 626 and the green bodies are subjected to a multistage sintering process which is carried out at least in part in the presence of nitrogen.

The present invention accordingly provides a process for producing a conductive sintered body based on silicon carbide, in which a) (preferably $\alpha$-)silicon carbide particles, which may have been pretreated with a surface modifier, are dispersed in an aqueous and/or organic medium and positive or negative surface charges are generated on the silicon carbide particles by adjustment of the pH of the dispersion obtained;

b) carbon black and boron carbide are mixed in as sintering aids, where at least the carbon black particles have a surface charge opposite to the surface charge of the silicon carbide particles and the boron carbide can also be added, completely or in part, at a later point in time (stage c'));

c) the slip obtained after stage b) is shaped directly to form a green body or c') a sinterable powder is isolated from the slip obtained and is shaped to form a green body, where the above boron carbide (completely or in part) can also be added to this sinterable powder; and d) the green body obtained is subjected to pressureless sintering to form a sintered body, where the process is characterized in that said stage d) is carried out in essentially three successive steps, namely (i) preheating to 1200–1900° C., (ii) sintering at 1900–2200° C. and (iii) post-heating at 2150–1850° C. and subsequent cooling to ambient temperature, and said step (i) is carried out in a nitrogen-containing atmosphere, said step (ii) is carried out in a noble gas (preferably argon) atmosphere and said step (iii) is carried out in an atmosphere containing nitrogen and/or carbon monoxide.

In a modification of this process, the slip obtained after stage (b) is applied to a sintering-resistant substrate and dried and the substrate thus coated is sintered as described in stage d).

As already mentioned above, the stages (a) to (c) of the process of the invention are carried out as described in DE-A-42 33 626, which in terms of details is hereby expressly incorporated by reference.

In stage (a), the silicon carbide powder is suspended in water and/or organic media.

Suitable organic dispersion media are especially water-miscible organic solvents such as alcohols, esters, ketones, dimethylfomamide and dimethyl sulphoxide.

The Si—OH groups present on the surface of the SiC particles are converted in the presence of protons or hydroxyl ions into charged groups Si—$OH_2^+$ or Si—$O^-$, which give rise to an electrostatic repulsion of the fine SiC particles and, thus, to a finely dispersed suspension.

Preferably, the formation of negative or positive surface charges is effected or aided by addition of an acid or base. Suitable acids for this purpose are, for is example, inorganic acids such as HCl, $HNO_3$, $H_3PO_4$, $H_2SO_4$ and also organic carboxylic acids such as acetic acid, propionic acid, citric acid, succinic acid, oxalic acid and benzoic acid. Suitable bases are, for example, $NH_3$, NaOH, KOH, $Ca(OH)_2$ and also primary, secondary and tertiary, aliphatic and aromatic amines and tetraalkylammonium hydroxides. It is likewise possible to use acidic or basic polyelectrolytes such as polyacrylic acid, polymethacrylic acid, polysulphonic acids, polycarboxylic acids and salts (e.g. having $Na^+$ or $NH_4^+$ as cations) of these compounds.

The surface charges generated in this way can be measured as the zeta potential. The zeta potential is pH-dependent and is either positive or negative in relation to the isoelectric point of the respective material (e.g. the SiC). As a result of the electrostatic charging with the same polarity, the dispersed individual particles remain stable in suspension.

According to a preferred embodiment of the present invention, the SiC powder is subjected to a surface modification before formation of the surface charges. According to the invention, this surface modification is carried out by coating the SiC with a surface modifier having functional groups which can be converted into negatively or positively charged groups by establishing an appropriate pH.

Suitable surface modifiers are, for example, silanes, acid chlorides, carboxamides, carboxylic anhydrides and carboxylic esters and also organic polyelectrolytes such as polyacrylic acid, polymethacrylic acid, polysulphonic acids, polycarboxylic acids and salts thereof.

Examples of silanes which can be used are mercaptopropyltrimethoxysilane, 3-(trimethoxysilyl)propyl methacrylate, 3-(triethoxysilyl)propylsuccinic anhydride, cyanoethyltrimethoxysilane, 3-thiocyanatopropyltriethoxysilane, 3-(2-aminoethylamino)propyltrimethoxysilane, 3-aminopropyltriethoxysilane, 7-oct-1-enyltrimethoxysilane, phenyltrimethoxysilane, n-butyltrimethoxysilane, n-octyltrimethoxysilane, n-decyltrimethoxysilane, n-dodecyltriethoxysilane, n-hexadecyltrimethoxysilane, n-octadecyltrimethoxysilane, n-octadecyltrichlorosilane, dichloromethylvinylsilane, diethoxymethylvinylsilane, dimethyloctadecylmethoxysilane, tert-butyldimethylchlorosilylmethyldisilazane, diethoxydimethylsilane, diethyl trimethylsilylphosphite, 2-(diphenylmethylsilyl)ethanol, diphenylsilanediol, ethyl (diphenylmethylsilyl)acetate, ethyl 2,2,5,5-tetramethyl-1,2,5-azadisilolidine-1-acetate, ethyltriethoxysilane, hydroxytriphenylsilane, trimethylethoxysilane, trimethylsilyl acetate, allyldimethylchlorosilane, (3-cyanopropyl)dimethylchlorosilane and vinyltriethoxysilane.

Examples of acid chlorides which can be used are acetyl chloride, propanoyl chloride, butanoyl chloride and valeryl chloride. Carboxylic anhydrides which can be used are, for example, acetic anhydride and propionic anhydride. Suitable carboxylic esters are, for example, ethyl acetate and a suitable carboxamide is acetamide.

To carry out the surface modification, the SiC particles are usually suspended in a nonpolar, aprotic solvent, e.g. an aliphatic or aromatic hydrocarbon such as hexane or toluene or an ether such as diethyl ether or THF and admixed with the surface modifier.

The solvent can subsequently be stripped off and the surface-modified material can be resuspended in an aqueous or organic medium, after which positive or negative surface charges are generated on the modified material by establishing an appropriate pH. If the surface modifier contains, for example, basic groups, as is the case for aminosilanes or mercaptosilanes, positive surface charges can be generated by establishing an acidic pH. On the other hand, if the surface modifier contains acidic groups, as is the case for carboxysilanes, negative surface charges are generated by establishing a basic pH.

The ($\alpha$-)SiC used in the process of the invention preferably has a particle size of from 0.005 to 100 $\mu$m, in particular from 0.01 to 50 $\mu$m, particularly preferably from 0.05 to 5 $\mu$m, and can be either in the form of SiC powder or in the form of whiskers, platelets or fibres.

The particle size of the first sintering aid carbon (carbon black) depends on the fineness of the SiC particles; the carbon particles should be increasingly fine, the finer the SiC particles. In general, the carbon has a particle size of from 1 to 100 mn, preferably from 5 to 80 nm, particularly preferably from 5 to 50 nm. The particle size of the second sintering aid $B_4C$ is usually from 0.0001 to 10 $\mu$m, preferably from 0.0005 to 5 $\mu$m, particularly preferably from 0.01 to 1 $\mu$m.

In the process of the invention, at least the sintering aid carbon black is mixed into the SiC slip in a state in which the carbon particles have surface charges of a polarity which is opposite to that of the surface charge on the SiC particles. This makes possible a uniform distribution of the sintering aid carbon black on the surface of the SiC particles.

An electrostatic charge on the sintering aid carbon black which is opposite to that on the SiC can be achieved, for example, by using types of carbon black having acidic or basic surface groups. Basic types of carbon black are obtained, for example, in the furnace black process in a reducing atmosphere. Acidic types of carbon black are formed, for example, in the gas black process in an oxidizing atmosphere. Commercial basic carbon blacks are, for example, PRINTEX A, G, L, L6 and P, PRINTEX 3, 25, 30, 40, 45, 55, 60, 75, 80, 85, 90, 95, 200 and 300 from DEGUSSA. Commercial acidic carbon blacks are, for example, Farbruß FW 1, FW 2, FW 2V, FW 18, FW 200, S 160, and S 170, Spezialschwarz 4, 4A, 5, 6, 100, 250, 350 and 550, PRINTEX 150T, U, V, 140 U and 140 V from DEGUSSA.

On mixing the SiC suspension and the sintering aid (carbon black), the latter adheres firmly to the surface of the SiC particles owing to the strong electrostatic attraction. In the process of the invention, the carbon black is always provided with a surface charge opposite to that of the SiC, since otherwise stable deposition and uniform distribution on the surface of the SiC particles is not possible. The second sintering aid component, i.e. $B_4C$, can, if desired, be mixed into the slip in uncharged form. If desired, the $B_4C$ can be added only later after producing a sinterable powder and redispersion with the aid of nonionic surfactants.

The amount of sintering aids added is usually, based on the SiC, from 0.1 to 5% by weight, preferably from 0.5 to 3% by weight, of carbon (carbon black) and from 0.05 to 5% by weight, preferably from 0.1 to 3% by weight and in particular from 0.2 to 2% by weight, of $B_4C$.

The ceramic slip obtained after stage (b) of the process of the invention, which generally has a solids content of from 10 to 60% by volume, is further processed in a customary manner to give a green body. The slip can be shaped directly to form a green body by, for example, tape casting, slip casting, pressure casting, injection moulding, electrophoresis, extrusion, hot casting, gel casting, freeze casting, freeze injection moulding or centrifugation.

However, this slip can also be used to produce coatings by means of customary wet coating techniques such as dipping, spraying, spin-coating or doctor-blade coating.

Alternatively, a sinterable powder can be isolated from the slip, for example by filtration, evaporation of the dispersion medium and spray drying or freeze drying. The sinterable powder obtained is then either pressed as such to form a green body, or else the sinterable powder is redispersed, preferably using a surfactant as dispersant, and the suspension is then processed according to one of the abovementioned shaping processes to form a green body. In this embodiment, suitable dispersants are, for example, inorganic acids such as HCl, $HNO_3$ and $H_3PO_4$; organic acids such as acetic acid, propionic acid, citric acid and succinic acid; inorganic bases such as NaOH, KOH and $Ca(OH)_2$;

organic bases such as primary, secondary and tertiary amines and also tetraalkylammonium hydroxides; organic polyelectrolytes such as polyacrylic acid, polymethacrylic acid, polysulphonic acids, polycarboxylic acids, salts (e.g. Na or $NH_4$) of these compounds, N,N-dialkylimidazolines and N-alkylpyridinium salts; or nonionic surfactants such as polyethylene oxide, fatty acid alkylolamides, fatty acid esters of sucrose, trialkylamine oxides and fatty acid esters of polyhydroxy compounds.

The green body or the layer is subsequently sintered to form a sintered body. While conventional sintering of the green body produces an SiC ceramic which has many advantageous properties and as a result is useful in many fields, as are indicated, for example, in DE-A-42 33 626, the SiC sintered body thus obtained has a low electrical conductivity and can thus not be used in fields in which a good electrical conductivity is required, for example for the manufacture of electric igniters.

It has been found according to the invention that it is possible to give the SiC sintered body, without impairing its other advantageous properties, also a good electrical conductivity (specific resistance usually from 0.5 to $10\Omega \times cm$), if the sintering stage (d) is carried out under specific conditions.

According to the invention, the sintering stage is essentially carried out in three steps or phases, namely (i) a preheating phase (if desired carried out in a plurality of stages) at a final temperature of 1200–1900° C., preferably 1500–1850° C., in particular 1600–1800° C. and particularly preferably 1650–1750° C;

(ii) a sintering phase at a temperature of 1900–2200° C., preferably 1950–2150° C. and particularly preferably 2000–2100° C.; and (iii) a post-heating phase at a temperature not above and preferably below the sintering temperature, i.e. at a temperature of 2150–1850° C., preferably 2100–1950° C. and particularly preferably 2100–2000° C., followed by cooling the sintered body to ambient temperature.

Apart from the temperature, the gas atmosphere in which the individual sintering phases are carried out is a further important feature of the present invention. According to the invention, the gas atmosphere in the individual phases has the following composition:

Phase (i): (non-oxidizing) nitrogen-containing atmosphere preferably containing at least 50, in particular at least 75 and particularly preferably at least 90, per cent by volume of nitrogen, where the remainder is composed of one or more gases which are inert towards silicon carbide (and silicon nitride) at the temperature used. These gases are preferably noble gases, in particular argon. Use is usually made of an atmosphere of 100% $N_2$.

Phase (ii): Noble gas atmosphere, in particular argon atmosphere. Other inert gases (or nitrogen) can also be present in this atmosphere, although this is not preferred.

Phase (iii): (non-oxidizing) atmosphere containing nitrogen and/or carbon monoxide. Besides nitrogen and/or carbon monoxide, it is also possible for other gases as can also be present in Phase (i) to be present. Although atmospheres of 100% of nitrogen or carbon monoxide can be used, particularly preferred atmospheres are those in which nitrogen is present in admixture with CO and/or noble gas (in particular argon). In such mixtures, the nitrogen preferably makes up at least 75, in particular at least 90 and particularly preferably at least 95, per cent by volume of the mixture.

In the individual phases (i) to (iii), the green body or sintered body is first heated or cooled to the temperature indicated and then held at this temperature for a certain period of time (known as hold time). The optimum hold time is a function of many factors, e.g. temperature, composition of the gas atmosphere, shape (in particular thickness) of the green or sintered body, construction of the heating apparatus, etc. The hold time is usually in the range from 5 minutes to 24 hours, more frequently from 10 minutes to 12 hours.

The process of the invention enables the production by pressureless sintering of an SiC ceramic which usually has the following properties:

density>85% of theory specific resistance of from 0.5 to $10\Omega \times cm$ (e.g. able to be adjusted by means of the conditions in stage (d), see examples)

good oxidation resistance (because of closed, finely distributed pores)

fine-grained, uniform microstructure having a mean grain size of about 5 $\mu m$ high strength (>300 MPa).

The sintered bodies which can be produced according to the invention are employed in all areas in which electrical heating is used. A particularly preferred use is that in the form of an electric (glow) igniter. The resistance of such an igniter can be adjusted by means of its geometry. Electric igniters produced from sintered bodies according to the invention can be operated, for example, at 220 volts and can be made very small. However, the sintered bodies which can be produced according to the invention are also suitable for use as large-volume components, e.g. a s SiC honeycombs which can be employed, for example, as diesel soot filters. In addition, the slip obtained in the process of the invention can be applied to (sintering-resistant) substrates and then be further processed like a green body, which enables electrically conductive layers on these substrates to be produced.

The following examples serve to illustrate the present invention without limiting it.

PREPARATIVE EXAMPLE 1

Electrostatic Coating of SiC Powders With Nanosize Carbon 3 g of carbon black (PRINTEX 90 from DEGUSSA) are dispersed in 200 ml of water at pH 5–6 in a stirred ball mill. 150 g of SiC powder are added to this suspension and the mixture is dispersed by milling for 2 hours. The contents of the mill are then allowed to settle and the liquid is filtered via a filter press. The powder obtained is dried for 10 hours at 90° C.

PREPARATIVE EXAMPLE 2

Preparation of an Aqueous SiC Slip From Electrostatically Coated Powder 150 g of the SiC powder prepared in Preparative Example 1 and 0.97 g of $B_4C$ are, with addition of 2% by weight of a nonionic dispersant (TWEEN 80 from ICI), dispersed in 70 ml of water in a stirred ball mill. The suspension obtained contains 40% by volume of SiC, 2% by weight of carbon black and 0.65% by weight of $B_4C$. The viscosity is <15 mPa s.

PREPARATIVE EXAMPLE 3

Production of Green Bodies

The suspension prepared according to Preparative Example 2 is, after allowing the milling media to settle, used to produce a green body by slip casting and the green body is dried. The latter has a green density of ≧60% of theory, a very narrow pore size distribution around 100 nm and is notable for a homogeneous carbon distribution over the entire thickness of the body (≦5 cm).

PREPARATIVE EXAMPLE 4

Surface-Modification of SiC Powder Using Silanes

The organoalkoxysilanes specified in the table below are dissolved in 100 ml of toluene. 50 g of SiC powder are added to the solution while stirring continuously. After addition is complete, the mixture is heated under reflux. After a reaction time of 5 hours, the hot suspension is filtered and the filter cake is washed with toluene. The moist powder is subsequently dried for 12 hours at 115° C.

TABLE

| Silanes | Amount (g) |
| --- | --- |
| Mercaptopropyltrimethoxysilane | 1.047 |
| 3-(Trimethoxysilyl)propyl methacrylate | 1.324 |
| 3- (Triethoxysilyl)propylsuccinic anhydride | 1.621 |
| Cyanoethyltrimethoxysilane | 0.933 |
| 3-Thiocyanatopropyltriethoxysilane | 1.179 |
| 3-(2-Aminoethylamino)propyltrimethoxysilane | 1.184 |
| 3 -Aminopropyltriethoxysilane | 1.179 |
| 7-Oct-1-enyltrimethoxysilane | 1.239 |
| Phenyltrimethoxysilane | 1.057 |
| n-Butyltrimethoxysilane | 0.951 |
| n-Octyltrimethoxysilane | 1.250 |
| n-Decyltrimethoxysilane | 1.397 |
| n-Dodecyltriethoxysilane | 1.774 |
| n-Hexadecyltrimethoxysilane | 1.736 |
| n-Octadecyltrimethoxysilane | 1.998 |
| n-Octadecyltrichlorosilane | 2.066 |
| Dichloromethylvinylsilane | 0.751 |
| Diethoxymethylvinylsilane | 0.855 |
| Dimethyloctadecylmethoxysilane | 1.828 |

EXAMPLES 1 TO 4

A green body having dimensions of 100×100×5 mm was produced by slip casting or pressure slip casting (pressure in the range 5–50 bar) from a slip having the composition: 97.87% by weight of α-SiC having a specific surface area of about 15 m$^2$/g, 0.13% by weight of B$_4$C having a specific surface area of about 15 m$^2$/g and 2% by weight of carbon black having a specific surface area of 250–300 m$^2$/g, which had been electrostatically deposited on the SiC. The green body had a density of >55% of theory and a pore distribution in the range from 40 to 100 nm.

To produce an electrically conductive SiC ceramic, the following sintering programme was employed:

(i) heating to 600° C. at 3 K/minute, hold time of 30 minutes, further heating to 1700° C. at 15 K/minute, hold time of from 60 to 120 minutes, in each case in a pure nitrogen atmosphere.

(ii) switching over to a pure argon atmosphere and then heating at 15 K/minute to the temperature indicated below, with the hold time indicated below at this temperature.

(iii) subsequent post-heating under the conditions indicated below and cooling to room temperature at 15 K/minute.

EXAMPLE 1

| | |
| --- | --- |
| Sintering temperature: | 2100° C |
| Hold time: | 30 minutes |
| Post-heating phase: | Temperature 2100° C. hold time 60 minutes; Atmosphere of N$_2$ containing 5 percent by volume of CO |
| Specific resistance: | 2 Ω × cm |
| Sintered density: | 2.87 g/cm$^3$ |
| Strength: | >300 MPa |
| Mean pore size: | about 1.5 μm. |

EXAMPLE 2

| | |
| --- | --- |
| Sintering temperature: | 2120° C. |
| Hold time: | 30 minutes |
| Post-heating phase: | Temperature 2100° C., hold time 60 minutes; Atmosphere of N$_2$ containing 5 percent by volume of CO |
| Specific resistance: | 4.5 Ω × cm |
| Sintered density: | 2.90 g/cm$^3$ |
| Strength: | >350 MPa |
| Mean pore size: | about 2 μm. |

EXAMPLE 3

| | |
| --- | --- |
| Sintering temperature: | 2130° C. |
| Hold time: | 30 minutes |
| Post-heating phase: | Temperature 2100° C., hold time 60 minutes; Atmosphere of N$_2$ containing 5 percent by volume of CO |
| Specific resistance: | 7 Ω × cm |
| Sintered density: | 2.93 g/cm$^3$ |
| Strength: | >450 MPa |
| Mean pore size: | about 2 μm. |

EXAMPLE 4

| | |
| --- | --- |
| Sintering temperature: | 2125° C. |
| Hold time: | 30 minutes |
| Post-heating phase: | Temperature 2100° C., hold time 60 minutes; Atmosphere of N$^2$ containing 5 percent by volume of CO |
| Specific resistance: | 5.5 Ω × cm |
| Sintered density: | 2.92 g/cm$^3$ |
| Strength: | >400 MPa |
| Mean pore size: | about 2 μm. |

APPLICATION EXAMPLE

Production of an Electric Igniter

A dumbbell-shaped electric igniter having a total length of 60 mm (length of the two end pieces 20 mm), a width of 4 mm or 2 mm and a thickness of 1 mm was produced mechanically from a plate produced as described in Example 4 (specific resistance 5.5Ω×cm).

The igniter had contacts applied at its ends and was operated using voltages of from 100 to 160 V. The surface temperatures shown in FIG. 1 resulted ($R_0$=1710Ω).

To determine the cyclic fatigue and ageing behaviour, the igniter was operated over 100,000 switching cycles. Even after the last switching cycle, no changes in the material properties could be observed.

Figure 2:
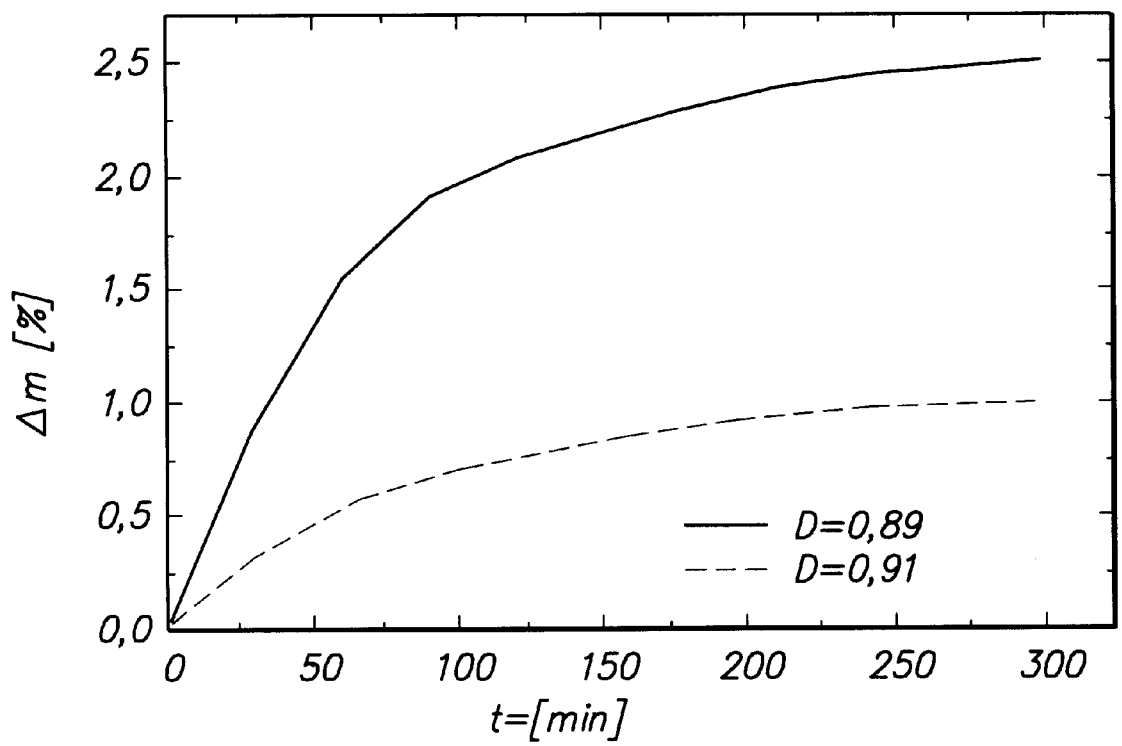

To determine the oxidation resistance, the electric igniter was heated in air to 1300° C. and held at this temperature for 300 minutes. There was a parabolic increase in weight which became less with increasing density, with an almost constant value becoming established after from about 200 to 250 minutes (see FIG. 2).

What is claimed is:

1. A process for producing a conductive sintered body based on silicon carbide, comprising:

(a) dispersing silicon carbide particles in an aqueous medium, an organic medium, or a mixture thereof, and generating postive or negative surface charges on the silicon carbide particles by adjustment of the pH of the dispersion;

(b) adding carbon black particles, and optionally adding boron carbide particles, to the dispersion, where at least the carbon black particles have a surface charge opposite to the surface charge of the silicon carbide particles, to form a slip;

(c) shaping the slip to form a green body, provided that this step (c) may be carried out only if boron carbide particles were added in step (b), or (c') (i) isolating a sinterable powder from the slip,
  (ii) optionally adding boron carbide particles to the sinterable powder, provided that boron carbide particles are added in this step (c') (ii) if they were not added in step (b), and
  (iii) shaping the sinterable powder to form a green body; and (d) pressureless sintering the green body in the three steps of (i) preheating to 120014 1900° C. in a nitrogen-containing atmosphere, (ii) sintering at 1900–2200° C. in a noble gas atmosphere, and (iii) post-heating at 1850–2150° C. and subsequent cooling to ambient temperature in an atmosphere containing nitrogen or carbon monoxide or a mixture thereof.

2. A process according to claim 1 wherein, in step (d) (i), the atmosphere comprises nitrogen, optionally in admixture with not more than 50% by volume of argon.

3. A process according to claim 1 wherein, in step (d) (iii), the atmosphere comprises nitrogen or carbon monoxide or a mixture thereof, optionally in admixture with argon.

4. A process according to claim 1 wherein the atmosphere in step (d) (i) consists of pure nitrogen, and/or the atmosphere in step (d) (iii) consists of at least 50% by volume of nitrogen in admixture with carbon monoxide or argon or a mixture thereof.

5. A process according to claim 1 wherein the temperature in step (d) (i) is 1500–1850° C., and/or the temperature in step (d) (ii) is 1950–2150° C., and/or the temperature of post-heating in step (d) (iii) is 2000–2100° C.

6. A process according to claim 1 wherein the hold times within the temperature ranges indicated in steps (d) (i) to (d) (iii) are from 5 minutes to 24 hours in each step.

7. A process according to claim 1 wherein the silicon carbide particles of step (a) have been treated with a surface modifier having functional groups which can be converted into negatively or positively charged groups at an appropriate pH.

8. A process according to claim 1 wherein the silicon carbide particles of step (a) have been treated with a surface modifier selected from the group consisting of silanes, acid chlorides, carboxamides, carboxylic anhydrides, carboxylic esters, and organic polyelectrolytes.

9. A process according to claim 1 wherein the silicon carbide is α-SiC.

10. A process according to claim 1 wherein step (c) comprises applying the slip to a sintering-resistant substrate and shaping it to form a green body on that substrate and step (d) comprises sintering the substrate with the green body thereon.

* * * * *